United States Patent
Berry

[15] 3,703,763
[45] Nov. 28, 1972

[54] METHOD OF MAKING A COMPOSITE METAL ARTICLE

[72] Inventor: Currie B. Berry, Baton Rouge, La.

[73] Assignee: Ethyl Corporation, New York, N.Y.

[22] Filed: Nov. 18, 1970

[21] Appl. No.: 90,876

[52] U.S. Cl. .................................................. 29/503
[51] Int. Cl. ......................... B23k 31/02, B23k 35/12
[58] Field of Search ....................................... 29/503

[56] References Cited

UNITED STATES PATENTS

| | | | |
|---|---|---|---|
| 1,340,264 | 5/1920 | Dean | 29/503 X |
| 1,813,657 | 7/1931 | Boothman et al. | 29/502 |
| 2,087,716 | 7/1937 | Bonscher | 29/503 X |
| 2,397,400 | 3/1946 | Borwich | 29/503 X |
| 2,824,543 | 2/1958 | Brown | 29/503 X |
| 3,063,145 | 11/1962 | Bouton | 29/503 X |
| 3,123,908 | 3/1964 | Boller | 29/503 X |
| 3,300,296 | 1/1967 | Hardy et al. | 75/20 |
| 3,305,902 | 2/1967 | Bjorksten | 164/55 |

FOREIGN PATENTS OR APPLICATIONS

2,009,551    6/1970    France ......................... 29/503

OTHER PUBLICATIONS

Handbook of Aluminum, Aluminum Company of Canada, Ltd., copyright 1957, pp. 110–111.
Soldering Aluminum, Reynolds Metals Company, 1959, pp. 2,3,12,13.

*Primary Examiner*—John F. Campbell
*Assistant Examiner*—Ronald J. Shore
*Attorney*—Donald L. Johnson, John F. Sieberth and Paul H. Leonard

[57] ABSTRACT

A method of making a composite article wherein a foamed aluminum article is bonded or brazed to a sheet aluminum article. Foamed aluminum and sheet aluminum are each pre-wet with molten zinc by abrading the materials or subjecting them to ultrasonic vibrations while submerged in molten zinc. The wetted metal surfaces are then brought together and the zinc melted and resolidified.

12 Claims, No Drawings

METHOD OF MAKING A COMPOSITE METAL ARTICLE

BACKGROUND OF THE INVENTION

The present invention is in the general field of metallurgy, particularly non-ferrous metallurgy. The invention is more especially related to the bonding of foamed aluminum metal to sheet aluminum metal.

A composite article of foamed aluminum and sheet aluminum is known wherein the sheet aluminum is bonded to the foamed aluminum by an adhesive system such as thermosetting organic polymer resins and elastomers. Although the use of such an adhesive system will effect a good bond between the layer of sheet aluminum and the foamed metal, the composite metal particle does not have sufficient strength, durability and heat resistance for all applications.

The present invention provides a bond between a foamed metal and a sheet metal which is superior to a composite metal article bonded with an adhesive, as such bond is stronger, more durable, and has greater heat resistance.

The present invention provides a composite metal article which is relatively light weight, warp resistant, deterioration resistant and which has strength and deflection characteristics superior to comparable composite metal articles bonded with adhesives.

SUMMARY OF THE INVENTION

A method of bonding or brazing a foamed metal body or article to a sheet metal body or article, wherein each metal body is pre-wet with zinc or a zinc alloy by abrading the facing of each of the metals to be bonded together while submerged in a molten zinc or zinc alloy bath. After the surfaces of the two metals have been wetted, they are brought into contact with each other and cooled, whereby molten zinc or zinc alloy solidifies to provide the superior bonding of the foamed metal body and the metal sheet.

DESCRIPTION OF THE PREFERRED EMBODIMENTS

In the preferred embodiment of the invention foamed aluminum is bonded to sheet aluminum. The foamed aluminum preferably has a density ranging from 5 to about 50 pcf (pounds per cubic foot), preferably from 5 to about 35 pcf, and more preferably from 8 to about 27 pcf. The aluminum sheet metal is preferably of a thickness of about 20 mils to about 40 mils.

A quantity of zinc or zinc alloy bonding material is placed in a suitable container and heated to a temperature sufficient to melt the bonding material and is retained at a temperature sufficient to retain the zinc or zinc alloy in a molten state, but which temperature is below the temperature sufficient to melt the aluminum sheet material and the foamed aluminum material to be bonded together.

After the zinc or zinc alloy is melted, the foamed aluminum material and the aluminum sheet material are each submerged or immersed in the molten zinc bonding material. The surfaces of the foamed aluminum and the sheet aluminum which are to be bonded together are abraded by any suitable means while being submerged in the molten zinc. Such abrading enables the surfaces of the materials to be bonded to be wetted with the molten metal bonding material. The two wetted surfaces are then brought together while still emerged in the molten zinc, withdrawn therefrom and allowed to cool. After cooling, the sheet aluminum is firmly bonded to the foamed aluminum.

The wetting and abrading of the aluminum sheet and the foamed aluminum may be carried out substantially simultaneously or may be performed in separate steps.

A preferred foamed metal is foamed aluminum. By aluminum is meant substantially pure aluminum as well as aluminum alloys containing 80 percent or more and preferably 90 percent or more aluminum. The following aluminum alloys are examples of useful alloys suitable for use in the present invention.

7075 (1.6% Cu, 2.5% Mg, 0.3% Cr, 5.6% Zn, remainder Al)
2024 (4.5% Cu, 0.6% Mn, 1.5% Mg, remainder Al)
5086 (0.45% Mn, 4.0% Mg, 0.1% Cr, remainder Al)
6063 (0.4% Si, 0.7% Mg, remainder Al)
Almag 35 (6 8% Mg in Al)
1000 series Al (99.6% minimum Al)
2011 (5.5% Cu, 0.5% Pb, 0.5% Bi, remainder Al)
2218 (4.0% Cu, 1.5% Mg, 2% Ni, remainder Al)
3005 (1.2% Mg, 0.4% Mg, remainder Al)
4042 (12.2% Si, 0.09% Cu, 1.1% Mg, 0.9% Ni, remainder Al)
4043 (5% Si, 95% Al)
8280 (1.5% Si, 1.0% Cu, b0.5% Ni, remainder Al)
Magnalium — 70% Al), 30% Mg The foamed metals used in the present construction may be prepared by processes known in the art. In general, such processes involve blowing molten metal with a suitable gas generating agent such as lithium hydride, titanium hydride, zirconium hydride and the like. Air properly entrained in a molten metal may also be used in preparing such foam. Where a blowing agent such as a metal hydride is used, a viscosity control additive may be used in the molten metal during the foaming process to help control the foam density pore uniformity. Representative examples of suitable processes for preparing foamed metal are found in U.S. Pat. No. 3,297,431, U.S. Pat. No. 3,300,296 and U.S. Pat. No. 3,305,902.

The density of the foamed aluminum may be varied as desired. As lightly foamed as practicable for the desired use of the bonded material is used in combination with a layer of sheet metal so that the required strength of the material is obtained at as low a weight per cubic foot of finished bonded article as desired. In the case of preferred foamed aluminum, foamed densities ranging from about 5 to about 50 pcf are useful, with 3 to 35 pcf range being preferred and 8 to 27 pcf range being particularly preferred.

In preparing the composite metal article of the present invention, the foamed metal and the sheet material are cut to the desired size. Before bonding the two materials together as described hereinabove, the articles are cleaned or degreased by washing with a suitable solvent such as a hydrocarbon (hexane and the like) or a chlorinated solvent.

The metal sheet material may be bonded to either surface of the foamed aluminum article in accordance with the foregoing procedure.

The bonding material of the present invention is preferably zinc or a zinc alloy containing at least 80 percent zinc. Zinc of a 99 percent purity is especially suitable. Other suitable low melting alloys, i.e. those with a melting point of less than 900°F, may be used within the scope of the invention. Alternatively, ultrasonic vibrations may be substituted for abrasion or the abrasion step of the present invention.

The following examples illustrate the method of the present invention, wherein an aluminum sheet is brazed to an aluminum foam with zinc:

EXAMPLE A

About 100 grams of zinc die casting alloy (SAE 903 — an alloy comprising 4 percent aluminum, 0.25% Cu and the remainder zinc) was melted in an electrically heated crucible about 1½ inch diameter by 6 inches deep. At a temperature of about 900°F a ½ inch × 6 inches strip of 3003 H–14 aluminum sheet was immersed in the molten alloy. Steel wool held with a pair of forcepts was also immersed and was rubbed against the aluminum sheet. This caused the area which was subject to abrasion to be uniformly wetted by the zinc alloy. The side of the sheet which was not abraided was not wet.

A ½ × ¾ × 6 inches block of foamed aluminum was given the same treatment. Then the two wetted surfaces were brought together beneath the surface, then withdrawn and allowed to cool.

When cool, the force required to peel the sheet from the foam was in excess of 60-pound force per linear inch. With adhesives the peel strength is usually in the range of 10–25 lbs per inch.

EXAMPLE B

Zinc of about 99 percent purity is melted in an insulated square container in which a row of ultrasonic transducers has been placed. The level of the molten zinc is about one-fourth inch above the upward pointing transducers. A sheet of 5052 aluminum sheet 25 mills thick is floated past the row of transducers. As the sheet passes the area of ultrasonic vibrations, the sheet becomes wetted with the zinc, and when the sheet is removed from the bath one side is uniformly coated with zinc.

A sheet of foamed aluminum 1 inch thick is coated in a similar manner. The precoated sheets are then heated to the melting point of the zinc (approximately 800°F) and passed through a set of rollers. The aluminum sheet bonds to the aluminum foam when the zinc solidifies.

EXAMPLE C

A 4 × 8 foot sheet of zinc alloy containing about 4% Al and 1% Cu and about 0.010 inches thick is placed between a 4 × 8 foot sheet of 6061 T–6 aluminum sheet 0.040 inches thick and a 4 × 8 foot sheet of foamed aluminum three-fourths inch thick. The sheets are placed in a 4 × 8 foot press which is at 800°F and about 30 psi of pressure is applied. The platens of the press are caused to vibrate, which in turn causes the foam sheet and the solid aluminum sheet to vibrate relative to each other resulting in an abrasive action. The press temperature is then lowered to 600°F and the sheets are removed from the press. The foam and solid sheet are bonded together in an extremely strong and durable bond.

The present invention not only provides a composite metal article of superior strength, durability and heat resistance, which may be widely used as an article of construction, but also provides a process which eliminates the necessity for a flux in bonding metallic materials.

The foregoing disclosure and description of the invention is illustrative and explanatory thereof and various changes in the size, shape and materials as well as in the details of the described method, may be made within the scope of the appended claims without departing from the spirit of the invention.

What is claimed is:

1. A method of bonding a foamed aluminum body to an aluminum sheet, comprising the steps of:
    a. melting a quantity of zinc or zinc alloy in a heating zone;
    b. immersing the foamed aluminum body and the aluminum sheet in the molten zinc or zinc alloy;
    c. abrading the surfaces of the foamed aluminum body and the aluminum sheet to be bonded together, whereby said surfaces are wetted;
    d. joining the wetted surfaces to be bonded together; and
    e. withdrawing the foamed aluminum body and aluminum sheet from the heating zone and allowing them to cool, thereby forming a composite metal article.

2. The method of claim 1, wherein the heating zone is heated to a temperature sufficiently great to maintain the zinc or zinc alloy in a molten state and below the melting point of the foamed aluminum body and the aluminum sheet.

3. The method of claim 1, wherein the foamed aluminum has a density ranging from about 5 pounds per cubic foot to about 35 pounds per cubic foot.

4. The method of claim 1, wherein the zinc bonding material is of a 99 percent purity.

5. The method of claim 1, wherein the foamed aluminum has a density of from about 8 to about 27 pounds per cubic foot.

6. The method of claim 1, wherein the zinc bonding material is a zinc alloy comprising about 4 percent aluminum, about 0.25 percent copper and the balance being zinc.

7. The method of claim 1, wherein the zinc bonding material is a zinc alloy containing at least 80 percent zinc and has a melting point less than 900°F.

8. The method of claim 1, wherein the aluminum sheet has a thickness of about 20 mils to about 40 mils.

9. A method of bonding a foamed aluminum body to an aluminum sheet, comprising the steps of:
    a. melting a quantity of zinc or zinc alloy having a melting point less than 900°F in a heating zone;
    b. immersing the foamed aluminum body and aluminum sheet in the molten zinc;
    c. subjecting the surfaces of the foamed aluminum body and the aluminum sheet to be bonded together with ultrasonic vibrations, whereby said surfaces are wetted;
    d. joining the wetted surfaces to be bonded together;
    e. withdrawing the foamed aluminum body and aluminum sheet from the heating zone; and f. cooling or permitting to cool the foamed aluminum body and aluminum sheet, thereby forming a composite aluminum article.

10. The method of claim 9, wherein the foamed aluminum body has a density ranging from about 5 to about 35 pounds per cubic foot.

11. The method of claim 9, wherein the aluminum sheet has a thickness of from about 20 to about 40 mils.

12. The method of claim 9, wherein the heating zone is heated to a temperature sufficiently great to maintain the zinc or zinc alloy in a molten state and below the melting point of the foamed aluminum body and the aluminum sheet.

* * * * *